US008610962B2

(12) United States Patent
Fischer et al.

(10) Patent No.: US 8,610,962 B2
(45) Date of Patent: Dec. 17, 2013

(54) SCREEN DESIGN FOR PROCESS VARIATION ARTIFACT REDUCTION

(75) Inventors: Mani Fischer, Haifa (IL); Doron Shaked, Tivon (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 434 days.

(21) Appl. No.: 12/991,017

(22) PCT Filed: May 9, 2008

(86) PCT No.: PCT/US2008/063254
§ 371 (c)(1),
(2), (4) Date: Nov. 4, 2010

(87) PCT Pub. No.: WO2009/136942
PCT Pub. Date: Nov. 12, 2009

(65) Prior Publication Data
US 2011/0090537 A1    Apr. 21, 2011

(51) Int. Cl.
*H04N 1/405* (2006.01)
*G06T 5/00* (2006.01)

(52) U.S. Cl.
USPC .......................... 358/3.26; 358/3.2

(58) Field of Classification Search
USPC .................. 358/3.01–3.26
See application file for complete search history.

(56) References Cited

U.S. PATENT DOCUMENTS

| 6,137,907 A | 10/2000 | Clark et al. |
| 6,870,642 B2 | 3/2005 | Ostromoukhov |
| 2002/0196484 A1 | 12/2002 | Chang |
| 2005/0254096 A1* | 11/2005 | Fischer et al. ............... 358/3.17 |

FOREIGN PATENT DOCUMENTS

| EP | 0741486 A1 | 11/1996 |
| EP | 1596572 A2 | 11/2005 |

OTHER PUBLICATIONS

Alleback JP: "DBS: retrospective and future directions", Proceedings of SPIE—The International Society for Optical Engineering 2001 SPIE US.
Supplementary European Search Report, Date: Jun. 5, 2011, appl No. PCT/US2008063254.
Nasanen, R., "Visibility of Halftone Dot Textures", IEEE Trans. Syst. Man Cybernetics, vol. 14 No. 6 pp. 920-924, 1984.
Fischer, D. et al., "Laser Print Quality: Sub-Pixel and Beyond", HP TechCon, 2004.
Fischer, M. et al., "Frequency Domain Design of Cluster Dot Screens", HP Laboratories.
Maurer, R. et al., "High Fidelity Laser-Based Printing".
Amir, G., et al., "Variable Resolution Printing: A Breakthrough in Print Quality and Productivity", HP TechCon06.
Fischer, M. et al., "Clustered Dots Screens with Reduced Low Frequency Artifacts", HPL TR 04-51, Mar. 2004.
International Search Report and Written Opinion of International Application No. PCT/US2008/063254, Jan. 29, 2009.

* cited by examiner

*Primary Examiner* — Barbara Reinier (57) ABSTRACT

In a method for designing a halftone screen configured to reduce artifacts in a printed image, artifacts due to a process variation resulting from printing of the image through use of a halftone screen design are modeled and the halftone screen is designed to have threshold values that substantially reduce the artifacts due to the process variation.

13 Claims, 7 Drawing Sheets

```
SIZE: 10 10
DEFINE: 20
```
350 ⟶
| 0 | 0.037500 | 1 | 0.010000 | 2 | 0.150000 | 3 | 0.200000 |
| 4 | 0.250000 | 5 | 0.300000 | 6 | 0.350000 | 7 | 0.375000 |
| 8 | 0.400000 | 9 | 0.450000 | 10 | 0.500000 | 11 | 0.550000 |
| 12 | 0.600000 | 13 | 0.650000 | 14 | 0.700000 | 15 | 0.750000 |
| 16 | 0.800000 | 17 | 0.850000 | 18 | 0.900000 | 19 | 0.950000 |

```
SUBLEVELS: 2
MATRIX1:
```
312 ⟶
| 18 | 15 | 6  | 1  | 5  | 8  | 4  | 3  | 7  | 17 |
| 14 | 10 | 0  | 0  | 2  | 11 | 16 | 12 | 9  | 13 |
| 5  | 8  | 4  | 3  | 7  | 17 | 18 | 15 | 6  | 1  |
| 2  | 11 | 16 | 12 | 9  | 13 | 14 | 10 | 0  | 0  | ⟵ 320
| 7  | 17 | 18 | 15 | 6  | 1  | 5  | 8  | 4  | 3  |
| 9  | 13 | 14 | 10 | 0  | 0  | 2  | 11 | 16 | 12 |
| 6  | 1  | 5  | 8  | 4  | 3  | 7  | 17 | 18 | 15 |
| 0  | 0  | 2  | 11 | 16 | 12 | 9  | 13 | 14 | 10 |
| 4  | 3  | 7  | 17 | 18 | 15 | 6  | 1  | 5  | 8  |
| 16 | 12 | 9  | 13 | 14 | 10 | 0  | 0  | 3  | 11 |

314 ⟶ MATRIX2:
| 19 | 16 | 7  | 2  | 6  | 9  | 5  | 4  | 8  | 18 |
| 15 | 11 | 1  | 0  | 3  | 12 | 17 | 13 | 10 | 14 |
| 6  | 9  | 5  | 4  | 8  | 18 | 19 | 16 | 7  | 2  | ⟵ 340
| 3  | 12 | 17 | 13 | 10 | 14 | 15 | 11 | 1  | 0  |
| 8  | 18 | 19 | 16 | 7  | 2  | 6  | 9  | 5  | 4  |
| 10 | 14 | 15 | 11 | 1  | 0  | 3  | 12 | 17 | 13 |
| 7  | 2  | 6  | 9  | 5  | 4  | 8  | 18 | 19 | 16 |
| 1  | 0  | 3  | 12 | 17 | 13 | 10 | 14 | 15 | 11 |
| 5  | 4  | 8  | 18 | 19 | 16 | 7  | 2  | 6  | 9  |
| 17 | 13 | 10 | 14 | 15 | 11 | 1  | 0  | 3  | 12 | ⟵ 342

```
END.
```

SCREEN DESIGN FOR PROCESS VARIATION ARTIFACT REDUCTION

CROSS-REFERENCE TO RELATED APPLICATIONS

The present application is related to U.S. patent application Ser. No. 10/844,993, entitled "Reduction of Harmonic Artifacts in Halftone Screens", filed on May 13, 2004, U.S. patent application Ser. No. 10/950,841, entitled "Screen Design", filed on Sep. 27, 2004, and EPO Patent Application Serial No. EP07117373.6, entitled "Method, System and Software for Screening an Image", filed on Sep. 27, 2007, the disclosures of which are hereby incorporated by reference in their entireties.

BACKGROUND

Presses often utilize irregular screen geometries because there are many more irregular screens than regular ones. As a result, irregular screen geometries provide a larger set of multi-separation screen combinations for avoiding interaction between screening frequencies of concurrent screens. However, irregular screen geometries often have harmonic artifacts as described in U.S. patent application Ser. No. 10/844,993. That application for patent shows how the artifacts, which originate from the digital design may be reduced. There are, however, additional harmonic artifacts that are often generated due to process variations (the analog part of the electrophotographic (EP) printing process), when using irregular screen geometries, and to a lesser extent when using regular screens. One such process variation exists in screen designs that utilize partial exposures in order to increase the native resolution of a press, as discussed in U.S. patent application Ser. No. 10/950,841.

For example, a press with a native resolution of 800 dpi may be operated at a virtual resolution of 2400 dpi by utilizing two partial exposure levels, $\frac{1}{3}$ and $\frac{2}{3}$, in addition to the 0 and 1 levels. Preparation of a halftone image using a conventional clustered dot technique includes grouping output pixels to form a halftone dot that varies in size and proximity to other halftone dots to convey analog pixel intensity information, for instance, a shade of grey that cannot be conveyed by varying output pixel intensity. Output pixels generally have a binary intensity. For example, a pixel is black when printed or white when not printed.

The halftone image is typically prepared by a computer, laser printer, ink printer, copier, or facsimile machine by digital computation and then stored in whole or in part prior to transferring the image to a tangible medium, such as printable media, film, or a printing plate. Translation by digital computation usually introduces some quantization and possibly inaccurate variation of halftone dot size and placement. Variations in the halftone dot size and placement also arise due to process variations caused during the transfer of the image to the tangible medium. One result of these variations is that they may give rise to undesirable, visible patterns known generally as screening artifacts. Screening artifacts are not pleasing to the eye and often produce patterns that are not in the original object. For example, a large area of the same color in the original can have a pattern with objectionable variation in color in the reproduced image.

It would thus be desirable to be able to achieve the better dot positioning, while substantially reducing or eliminating the visibility of screening artifacts caused by variations in the halftone dot size and placement.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are methods and systems for designing a halftone screen configured to reduce artifacts in a printed imaged that are due to one or more process variations resulting from printing of the image through use of a halftone screen design. Generally speaking, the methods and systems disclosed herein model the harmonic artifacts caused by the process variation(s) and provide optimizations to the model that substantially minimize a cost function and thereby reduce the appearance of the harmonic artifacts. In one regard, therefore, the screens designed through implementation of the methods and systems disclosed herein are robust to the harmonic artifacts.

Figure 1:
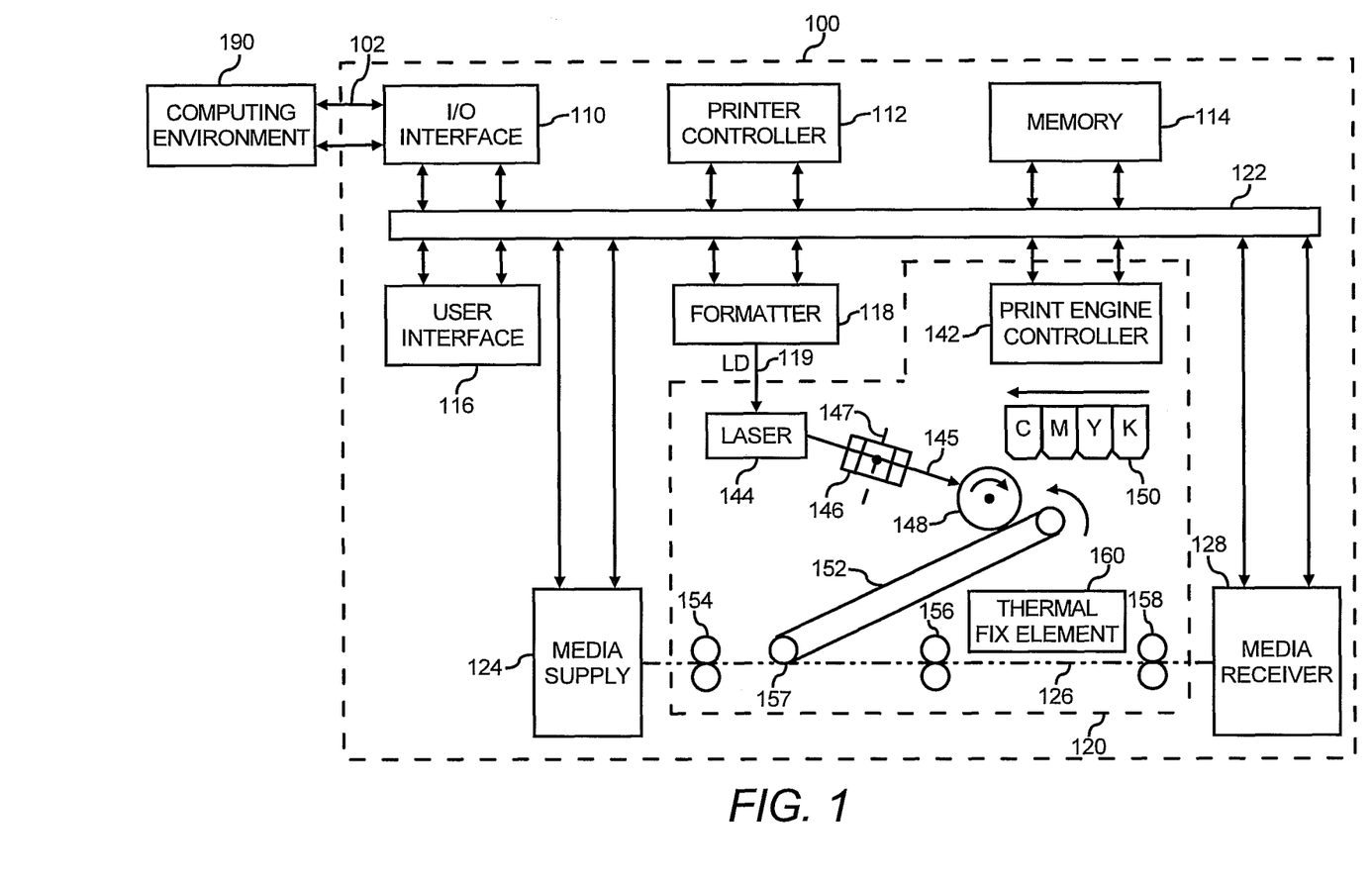
FIG. 1 depicts a simplified functional block diagram of an imaging apparatus 100 configured to perform various operations discussed herein, according to an embodiment of the invention.

With reference first to FIG. 1, there is shown a simplified functional block diagram of an imaging apparatus 100 configured to perform various operations discussed herein, according to an example. It should be understood that the imaging apparatus 100 may include additional elements and that some of the elements described herein may be removed and/or modified without departing from a scope of the imaging apparatus 100.

The imaging apparatus 100 is generally configured to produce halftone images on print media through use of screen designs. It should be understood that the terms "halftone images" may also encompass hybrid halftone images. According to an example, the imaging apparatus 100 comprises a digital printing press having a laser writing head system. In addition, the imaging apparatus 100 may be a stand-alone imaging apparatus or may be part of a photocopier, a multifunction printer ("MFP"), commercial presses using dry toner or liquid ink, scanner, a printer, a facsimile device, etc.

As discussed above, harmonic artifacts are often generated due to process variations (the analog part of the electrophotographic (EP) printing process) when irregular screen designs are used. As discussed in greater detail herein below, the imaging apparatus 100 utilizes screen designs that are generally robust to these harmonic artifacts in the halftone images. In addition, the imaging apparatus 100 may also be robust to artifacts in full tone images caused by process variations, as also discussed in greater detail herein below.

As shown in FIG. 1, the imaging system 100 includes an Input/Output ("I/O") interface 110, a bus 122 for communicating the data to a formatter 118, a print media path 126 including a print engine 120 for handling print media and for printing a halftone image on the print media as provided by the formatter 118. The imaging apparatus 100 also includes a printer controller 112, a memory 114, a user interface 116, a media supply 124, and a media receiver 128.

The I/O interface 110 couples the imaging apparatus 100 to a rendering device 200 (shown in FIG. 2) and a computing environment 190 for receiving a description of data to be imaged via a line 102. The computing environment 190 may include a computer network, a stand-alone computer, the rendering device 200, etc.

The user interface 116 provides controls and displays that facilitate operator interaction with the imaging apparatus 100, and includes circuits for various control switches (or a keyboard), an alphanumeric/graphic display, and various discrete indicators.

The printer controller 112 provides overall control of printing functions, including preparation of commands for the formatter 118, the print engine 120, and user interface 116, in response to commands received via the I/O interface 110. According to an example, the printer controller 112 includes a microprocessor circuit programmed to perform methods including, receiving and sending messages via the bus 122 and the I/O interface 110, sensing operator controls, providing operator information displays via bus 122 and user interface 116, controlling the cooperation of formatter 118 and print engine 120 by receiving status from each via the bus 122, commanding a sequence of operations to accomplish image formation, printing, etc.

The memory 114 provides storage for information such as program instructions, constants, and variables. The memory 114 includes any device capable of storage of information or any combination of devices capable of storage of information, such as, a semiconductor device, a magnetic disk memory device, nonvolatile memory devices, such as, an EEPROM or CDROM, etc. The constants and variables may include tables of information organized as data structures, indexed in any convenient manner. Examples of the constants and variables include an input bit map, color table, output pixel geometry table, a halftone image buffer, a table look-up associating laser power values with developing selected amounts of toner or ink, etc. The constants, variables or tables may be organized, stored, and accessed using one or more data structures, arrays, linked lists, files, FIFO buffers, or the like.

The bus 122 is primarily controlled by the printer controller 112 and includes, in one example, a parallel digital communication bus. The printer controller 112 communicates via the bus 122 with the I/O interface 110, the user interface 116, the memory 114, the formatter 118, the print engine 120, the media supply 124, and the media receiver 128 by sending commands and receiving status information.

A paper path 126 of a printer 100 includes various sensors and media handling devices for passing print media from a media supply 124 through the print engine 120 and to a media receiver 128. The paper path 126 extends from the media supply 124, passes through a media handler 154, comes in contact with a transfer belt 152 at point 157, passes through a media handler 156, passes by a thermal fix element 160, passes through a media handler 158, and extends into the media receiver 128.

The print engine 120 includes a mechanism for forming an image on the print media based upon received commands directing printing operations from the bus 122 and includes an electrophotographic printing mechanism for printing images on print media. The print engine 120 prints graphics by printing one or more halftone images as described in greater detail herein below. The print engine 120 includes a print engine controller 142, a laser 144, a rotating mirror 146, a photoconductive drum 148, a toner or ink dispenser 150, a transfer belt 152, the thermal fix element 160, and the media handlers 154, 156, and 158.

The print engine controller 142 includes any circuit for coupling a print engine 120 to a communication bus 122 for receiving control messages and providing status messages. The print engine controller 142 includes, for instance, a microprocessor based control circuit for controlling various power supplies and motors, and for coordinating the sequence of operations that result in the transfer of an image, such as a halftone image, onto print media as it travels along the media path 126.

To form a halftone image on a print media, the print engine 120 performs an electrophotographic printing process or a liquid electrophotographic printing process in response to laser drive signals LD conveyed from the formatter 118 to the print engine 120 on a line 119. The laser drive signal ("LD") conveys in serial a halftone image in digital format. The laser 144 receives the laser drive signal LD and provides modulated laser light directed toward the rotating mirror 146. The laser light is modulated in several ways. The laser light is modulated by either being "on" or "off".

In addition, if the laser light is on, the laser light is modulated in terms of intensity so that lesser than a full amount of power is delivered by the laser 144 to a photoconductive drum 148. The laser light may be modulated to substantially discrete partial levels between a zero (0) power level and a fully on (1) power level. By way of example, the discrete partial levels may comprise a ⅓ power level, a ⅔ power level, a ¼ power level, etc. In one regard, the laser light may be variably exposed in the discrete partial levels to increase the resolution at which an imaging device may print images. For instance, the laser light modulation discussed herein may be implemented to cause an imaging device having a native resolution of 800 dpi to reach a virtual resolution of 2400 dpi.

The laser exposure may be modulated using either pulse width modulation or using laser power modulation. The rotating mirror 146 includes a six-faceted mirror assembly that rotates on an axis 147 so that modulated laser light forms a beam 145 that scans across the length of the photoconductive drum 148. The photoconductive drum 148 holds an electrostatic charge distributed on the surface of the drum. As the photoconductive drum 148 rotates on its lengthwise axis (not shown) each scan depletes a portion of this charge in accordance with the laser modulation. Each such portion is developed by the deposition of toner or ink from dispensers 150 onto the photoconductive drum 148. Dispensed toner or ink is transferred from the photoconductive drum 148 to the transfer belt 152 and then from the transfer belt 152 to media at a point 157. In an example embodiment that uses toner, a thermal fix element 160 applies heat to fix the toner to the media.

Color printing may be accomplished by sequentially forming four separate halftone images on the photoconductive drum 148, one for each color: cyan, magenta, yellow, and black (CMYK). After each image is written onto the photoconductive drum 148, a suitable toner is dispensed and transferred to the transfer belt 152. The photoconductive drum 148 is then initialized for a subsequent image. When toner for all four images has been transferred to the transfer belt 152, toner may then be transferred onto a print media at the point 157 and fixed thereon by the thermal fix element 160. It should be noted that ink, pigment, or another suitable substance may be substituted for toner without departing from a scope of the imaging apparatus 100.

The formatter 118, in one example, includes any reasonably suitable circuit for providing data that defines the halftone image. The formatter 118 includes a microprocessor circuit that cooperates with the memory 114. When the I/O interface 110 receives a description of data to be printed, a bit map description of that data is provided by the printer controller 112 and stored in the memory 114. The formatter 118, reads the bit map description, prepares one or more halftone image descriptions, and may store the halftone image descriptions in the memory 114. The formatter 118 also provides a laser drive signal LD on line 119 to the laser 144 for modulating the laser beam 145 in accordance with the halftone image description to provide a halftone image.

Figure 2:
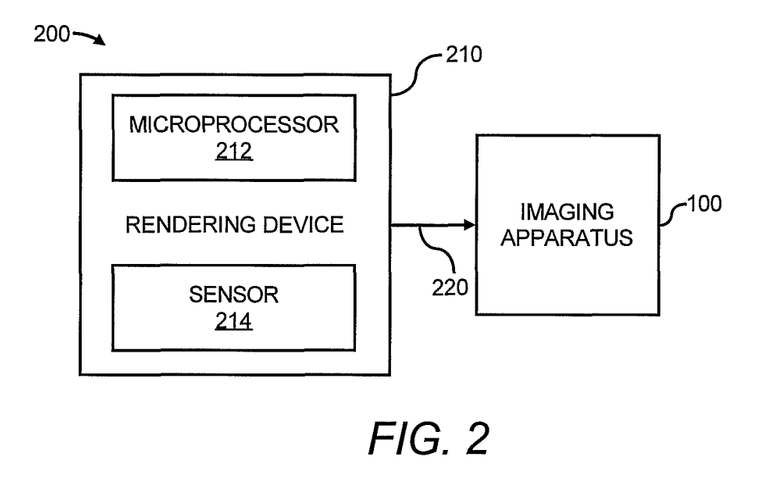
FIG. 2 shows a schematic diagram of a system 200 which includes a rendering device 210 and an imaging apparatus 100, according to an embodiment of the invention.

Turning now to FIG. 2, there is shown a schematic diagram of a system 200 which includes a rendering device 210 and an imaging apparatus 100, according to an example. The rendering device 210 generally provides control and displays that facilitate rendering of an original image and includes circuits for controlling the rendering process. As shown, the rendering device 210 includes a microprocessor 212 and a sensor 214 that senses the original image on an optical basis or may receive an original digital data file. The rendering device 210 senses the original image, divides the original image into pixels and determines pixel values for the image. In other words, the rendering device 210 digitizes the original image and produces an output signal 220 that includes the locations of the pixels as well as other related values associated with the pixels derived from the rendering device 210. The output 220 of the rendering device 210 is input to the imaging apparatus 100. The output 220 may be passed to the imaging apparatus 100 via the line 102 (FIG. 1). The imaging apparatus 100 has a set resolution designated in dots per inch ("dpi"), but may be operated to print at a higher resolution through implementation of appropriate screening techniques.

The appropriate screening techniques may include arranging ink dots on media to produce patterns of various average shades of gray or color while minimizing artifacts associated with the dot pattern. In one example, screens are designed such that the ink dots are specified at a higher resolution than the resolution of the imaging apparatus 100. In other words, the screens may be designed to cause the light from the laser 144 to be modulated into substantially discrete partial levels to print the ink dots at the higher virtual resolution as described above. As such, the ink dots are positioned closer to one another than the fixed resolution of the imaging apparatus 100 would permit.

Figure 3:
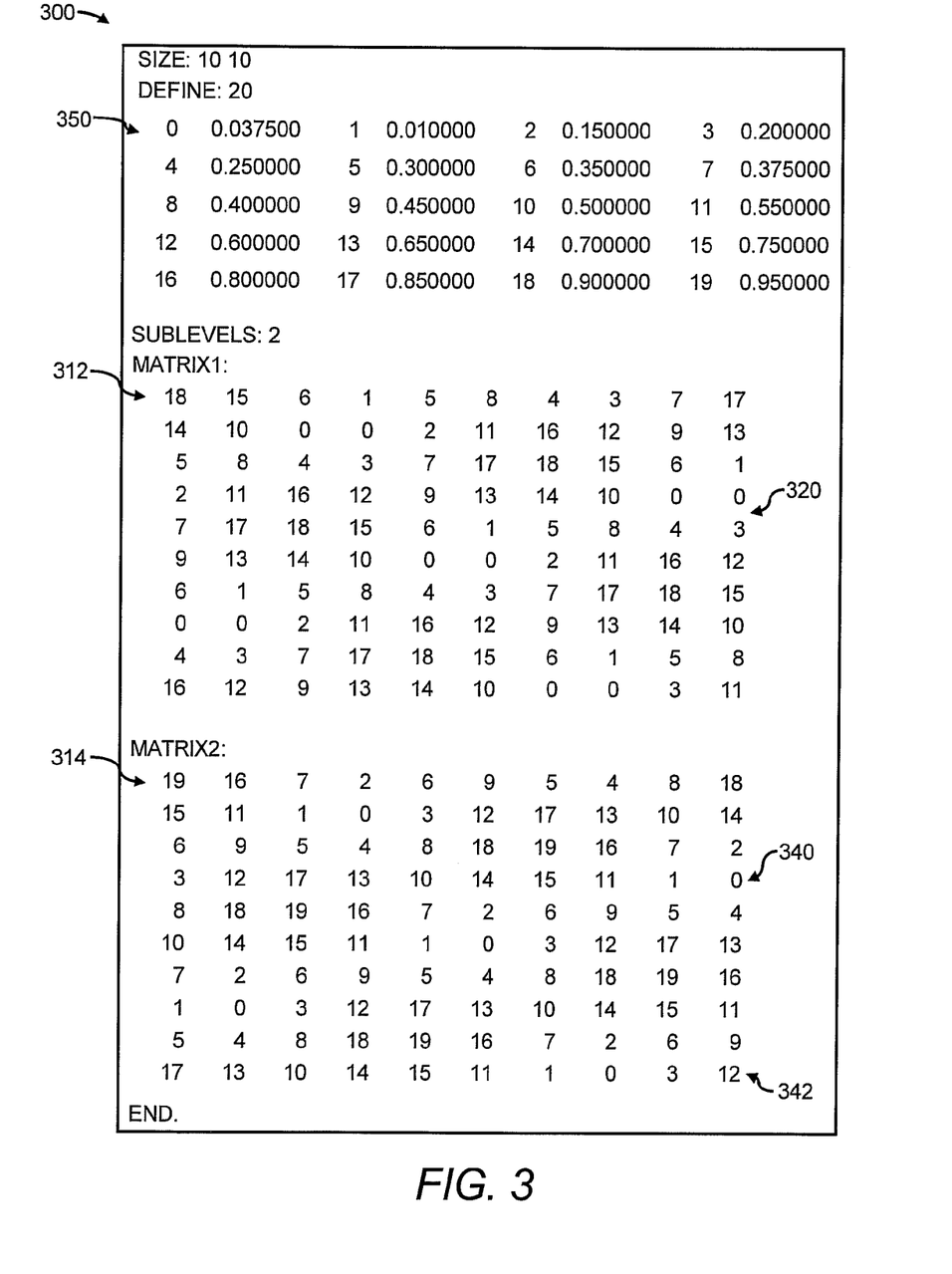
FIG. 3 depicts a diagram of a pair of a first exposure level screening matrix and a second exposure level screening matrix, according to an embodiment of the invention.

Reference is now made to FIG. 3, which illustrates a diagram 300 of a pair of a first exposure level screening matrix 312 and a second exposure level screening matrix 314, according to an example. It should be understood that the diagram 300 is a generalized depiction of screening matrices and that it may be modified in various manners without departing from a scope of the screening matrices 312 and 314 depicted therein. In addition, although two screen matrices 312 and 314 have been depicted, three, four, five, or any other suitable multiple number of exposure screening level matrices may be implemented. A more detailed discussion of the screening matrices 312 and 314 and various manners in which they may be implemented is contained in the EP07117373.6 application for patent, the disclosure of which is hereby incorporated by reference in its entirety.

The exposure level screening matrices 312 and 314 are arranged to screen pixels of the image and each matrix is associated with a different printing exposure level. Each matrix 312 and 314 includes a set of threshold values for screening a corresponding set of pixels in the image. The first exposure level screening matrix 312 includes a first set of threshold values and the second exposure level screening matrix 314 includes a second set of threshold values.

Each pixel of the image to be printed has an associated continuous tone (CT) value. If an entire image or region of an image is desired to be printed at a particular CT value, then each pixel within the image or region of the image will have the same associated desired CT value. Although not shown, the system 200 may include a comparator arranged to determine an exposure level at which the pixels should be printed or whether or not the pixels should be printed at all. The comparator achieves this by comparing the CT value of each pixel with its corresponding threshold value from either one or both of the matrices 312 and 314.

As shown in FIG. 3, the screening matrices 312 and 314 are sized at 10 by 10 pixels. Two matrices are provided since the variable exposure level laser printer to which they are required to provide instructions comprises two exposure levels, a full exposure level and an intermediate exposure level. The first matrix 312 is a partial exposure level screening matrix and the second matrix 314 is a full exposure level screening matrix. The first matrix comprises a first set 320 of 100 (10 by 10) threshold values. The second matrix 14 comprises a second set 340 of 100 threshold values. In this example the threshold values provided in the second set 340 are greater than (or equal to, when zero) the corresponding values provided in the first set 320. In other examples, there may be different relationships, or no relationship, between the threshold values of the first 320 and second 340 sets.

Also shown in FIG. 3 is a matrix dictionary in the form of a key table 350. The key table 350 comprises twenty reference numerals which correspond to different continuous tone values. The reference numerals in the first 320 and second 340 sets of threshold values correspond to the continuous tone values provided by the corresponding reference numerals in the key table 350. In other examples, a key table may not be provided and the sets of threshold values in the matrices include the continuous tone values themselves. The provision of the key table provides a clear and compact matrix structure according to an example.

The reference numerals within each matrix 312 and 314 represent threshold values which are used to compare against the continuous tone value of an image to be printed (e.g. a continuous tone image) and from this it can be determined, for each pixel, whether or not that particular pixel should be printed in order to provide the desired image.

For example, in the example depicted in FIG. 3, a continuous tone image to be printed is represented by a number from 0.000 (white) to 1.000 (black). Therefore the shade of the continuous image that is required is represented by a number between 0 and 1, e.g., gray 0.270 or gray 0.310 etc.

In this example, the key table 350 comprises twenty reference numerals corresponding to twenty different continuous tone threshold values.

When the comparator (not shown) is required to make a determination as to whether or not a pixel should be printed at a particular laser exposure, the continuous tone value of the image to be printed is compared with the threshold value within the relevant exposure level matrix for that pixel. For example, when considering a block of 10 by 10 pixels within an image to be printed, in order to determine whether any of those pixels should be printed at a full laser exposure, the desired continuous tone value of the final image (e.g., 0.370) is compared to the threshold value within the second matrix 314, pixel by pixel. For example, for the final pixel in the matrix (the bottom right pixel 342), the threshold value is compared with the desired CT value. The CT value (0.370) which translates according to the key table 350 to 7 (nearest value to 0.370 is 0.375) is less than the threshold value 12 (pixel 342). Therefore this pixel is not printed at full laser exposure. If the desired CT value is instead, for example, 0.800, then the same pixel would be printed at a full laser exposure since the desired CT value (0.800) which translates to 16 would be greater than the relevant threshold value (12). Partially exposed pixels would be printed if their translated value according to the key table 350 is greater or equal to the threshold values of the first matrix 312, but less then the second matrix 314.

Reference is now made to flow diagrams of the methods 400, 500, 700, and 800, respectively depicted in FIGS. 4, 5, 7, and 8. It should be apparent to those of ordinary skill in the art that other steps may be added or existing steps may be removed, modified or rearranged without departing from the scopes of the methods 400, 500, 700, and 800.

Some or all of the operations set forth in the methods 400, 500, 700, and 800 may be contained as utilities, programs, or subprograms, in any desired computer accessible medium. In addition, the methods 400, 500, 700, and 800 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

A controller, such as a processor (not shown), ASIC, microcontroller, etc., may implement or execute one or more of the methods 400, 500, 700, and 800.

Figure 4:
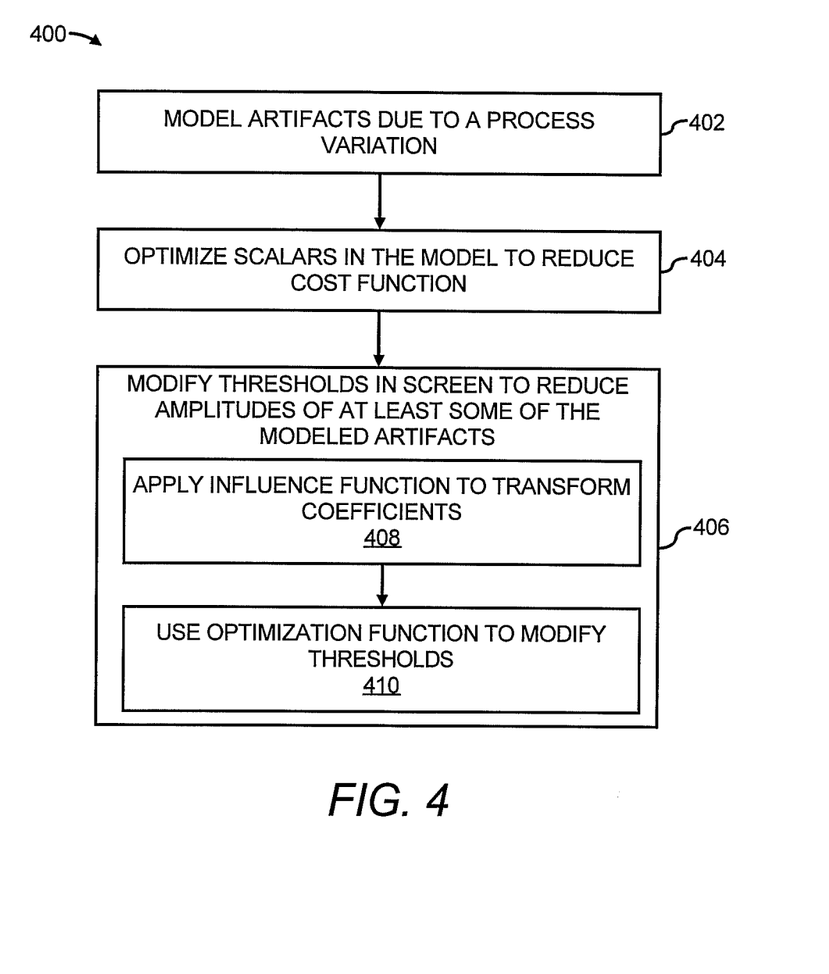
FIG. 4 shows a flow diagram of a method for designing a screen design to reduce artifacts in a printed image, according to an embodiment of the invention.

Turning first to FIG. 4, there is shown a flow diagram of a method 400 for designing a halftone screen to reduce artifacts in a printed image, according to an example. At step 402, artifacts due to at least one process variation resulting from printing of the image through use of a halftone screen design are modeled. The artifacts may be modeled in the frequency domain. These types of artifacts have been found to arise due to process variations in partial dot exposure, which is needed in order to increase the screen dot placement addressability. The partial dot exposure may be achieved through either pulse width modulation for sub pixel addressability in the scan direction or laser power modulation, which increases addressability in both the scan and cross-scan directions.

The model created at step 402 contains components configured to model patterns for different partial dot exposures. For instance, the model includes a component containing a pattern of a nominal pattern, a component containing a pattern of a first partial dot exposure, a component containing a pattern of a second partial dot exposure, etc. In addition, the components containing patterns of the partial dot exposures are weighted by scalars. The scalars of the components are determined as a design parameter, for instance, as a measure of the weight desired for the variabilities in the partial dot exposures from the nominal values. By way of example, the scalars may be determined through a trial and error process to identify substantially optimized values for the scalars. The model therefore not only considers the nominal pattern resulting from the combination of the different partial dot exposures, but also considers the patterns that result from the individual partial dot exposures.

The model disclosed herein is configured to model any process variation that is substantially consistent throughout a rendering and may thus be expanded to consider any such process variations. According to an example, the model is configured to model separate artifacts arising from process variations affecting different partial dot exposures created by different laser power levels between an "off" condition and an "on" condition. As another example, the model is configured to model substantially consistent deviations from the nominal dot coverage, such as, deviations in which certain dots are consistently darker or lighter than other dots. By way of particular example, the model may consider situations where horizontally neighboring dots are darker than vertically neighboring dots or where diagonally adjacent pixels have a substantially consistent artifact. In this example, the model may consider the nominal pattern resulting from the combination of the different partial dot exposures as well as a pattern that is composed only from the horizontally neighboring dots.

With particular reference to laser power modulation, a fully exposed pixel is considered to have a laser power of 1 and an unexposed pixel is considered to have a laser power of 0. In this regard, the partial dot exposure may have values that range between 0 and 1, and more particularly, may have partial values of 1. By way of particular example, the partial dot exposures may include laser power values that result in ⅓ and ⅔ coverage of a pixel area. The initial assumption has been that when the laser power value is set to image pixels according to the desired coverage areas, that the desired coverage is obtained. However, due to one or more process variations, such as, inconsistency of the laser beams, the partially exposed pixels typically have coverage areas that divert from the nominal discrete coverage areas.

One result of the divergence from the nominal discrete coverage areas is that harmonic artifacts are often introduced into the printed image. According to an example, the harmonic artifacts may be modeled by applying a screen to different contone input images, and performing a Discrete Fourier Transform (DFT) on the resulting halftone images. Each contone input image has only one tone level, and the different contone input images have different tone levels.

Alternatives to the DFT include the Discrete Cosine Transform (DCT) and the Discrete Sine Transform (DST). Other transforms which generate frequency content may also be used.

Each halftone image is transformed into an image having transform coefficients. The transform provides an indication of artifacts that are expected to appear in an image rendered at a given tone level. The DFT identifies the artifact magnitude for each frequency. Higher amplitudes correlate to more significant artifacts.

According to a particular example in which the laser power levels are in the range of (0, ⅓, ⅔, 1), to account for the artifacts which generally causes the partial laser power levels to not always result in the intended partial laser power levels, the laser power levels may be modeled as:

$$\{0,(1\pm a)*1/3,(1\pm b)*2/3,1\},a,b\in(0,\epsilon).$$ Equation (1):

In Equation (1), a and b are the uncertainties in the partially exposed printed dot sizes. In addition, the partially exposed pixel values are allowed to vary independently within some uncertainty interval $\epsilon$. It should be understood that the model depicted in Equation (1) may be expanded to cover additional partial laser power levels, such as, ⅕, ⅖, ⅐, etc.

The model in Equation (1) may be translated into a modified cost function, in which the artifacts are modeled as a function of parameters representing process variants, for instance, as depicted in the following function:

$$A_t\{Pat_{\{0,\frac{1}{3},\frac{2}{3},1\}}\} + \epsilon_a \cdot A_t\{Pat_{\{0,\frac{1}{3},0,0\}}\} + \epsilon_b \cdot A_t\{Pat_{\{0,0,\frac{2}{3},0\}}\}.$$ Function (1)

In Function (1), $Pat_{\{w,x,y,z\}}$ is the digital pattern which will usually be rendered by laser power levels tuned to the nominal coverage of {0, ⅓, ⅔, 1}, and $\epsilon_a$ and $\epsilon_b$ are scalars (for instance, design parameters) corresponding to the respective uncertainty intervals of a and b. As shown in the Function (1), the artifacts are modeled as a linear approximation with respect to the parameters representing the process variants. $A_t$ are the modeled artifacts for any tone level t measured from the following equation:

$$A_t^{1sep} = \|H^{1sep}*DFT(Pat_{\{w,x,y,z\}})\|_2, \text{ where}$$ Equation (2):

In Equation (2), $\|\circ\|_2$ is a cost function, such as, the $L_2$ norm (that is, the sum of squared weighted transform amplitudes, excluding the DC), H is a frequency weight matrix that includes elements from a human visual system (HVS) model, and * is the element-wise matrix product. In addition, Equation (2) is considered as a single separation (1sep) artifact model for any tone level t. A more detailed discussion of manners in which the single separation artifacts, as well as, multi-separation artifacts, may be calculated is contained in the article entitled "Frequency Domain Design of Cluster Dot Screens", by the inventors of the present invention, the disclosure of which is hereby incorporated by reference in its entirety.

According to another example in which the effective ink coverage of a single pixel varies according to local dot configurations, the effective ink coverage of a pixel may be modeled as:

$$\{0,(1\pm a),(1\pm b),(1\pm c)\},a,b,c\in(0,\epsilon).$$ Equation (3):

In Equation (3), a, b, and c are the uncertainties in the effective coverage corresponding to three distinct dot configuration sets, including all the possible dot configurations in that screen. Namely, for any given local dot configuration, the model in Equation (3) identifies a certain class of uncertainty value. In addition, effective coverage values are allowed to vary independently within some uncertainty interval $\epsilon$.

The model in Equation (3) may be translated into a modified cost function, for instance, as depicted in the following function:

$$A_t\{Pat_{\{0,1,1,1\}}^C\} + \epsilon_a \cdot A_t\{Pat_{\{0,1,0,0\}}^C\} + \epsilon_b \cdot A_t\{Pat_{\{0,0,1,0\}}^C\} + \epsilon_c \cdot A_t\{Pat_{\{0,0,0,1\}}^C\}.$$ Function (2)

In Function (2), $Pat^C_{\{w,x,y,z\}}$ is the digital pattern which will usually be rendered by laser power level w for white dots, and laser powers x, y, and z for dots whose neighborhood belongs to the three different pattern sets having similar coverage uncertainties, and $\epsilon_a$ and $\epsilon_b$ are scalars (for instance, design parameters) corresponding to the respective uncertainty intervals of a and b.

With reference back to FIG. 4, at step 404, the scalars in the model created at step 402 are chosen to weigh between the 3 components of Function (1) or between the 4 components of Function (2). In other words, the scalars are chosen to weigh between the nominal dot pattern (first component), and the partially exposed dot patterns pertaining to respective process variations (the second and third components). According to an example, the scalars may be chosen through a trial and error process. More particularly, for instance, values for the scalars may be found such that, when solving the optimization problem with the cost function (1) or (2), neither artifacts that originate from the digital design nor artifacts that originate from process variations are visible to the human eye.

At step 406, a screen, for instance, the screen 300 depicted in FIG. 3, is designed to have thresholds 312 and 314 that substantially reduce the amplitudes of at least some of the artifacts modeled at step 402. The thresholds 312 and 314 in the screen 300 may be modified to migrate harmonic content from perceptible frequencies to imperceptible or less perceptible frequencies.

Modification of the thresholds 312 and 314 in the screen 300 may include applying an influence function to coefficients of the transform, as indicated at step 408. The influence function, which corresponds to the human visual system, determines which frequencies are more perceptible. To a very rough approximation as a linear spatially-invariant system, the human visual system is lowpass. With respect to noise in still images, the human visual system is in general less sensitive to uncorrelated high-frequency noise than uncorrelated low-frequency noise. Frequencies closer to the DC (zero frequency) have a greater impact on the human visual system. In addition, artifacts closer to 0 and 90 degrees have greater impact on the human visual system then artifacts on a diagonal. All the different frequencies in a given screen per each tone level are weighted. The influence function has a larger weight for transform coefficients around DC than for transform coefficients around other screen harmonics.

At step 410, an optimization function may be used to modify the values of the thresholds 312 and 314 in the screen 300. A goal of the optimization function is to shift the amplitude from perceptible artifacts to non-perceptible artifacts. Thus, perceptible artifacts are diminished, and imperceptible artifacts are enhanced.

According to an example, halftone screens may be modified off-line. In addition, halftone screens need be modified only once through implementation of the method 400.

Although not explicitly discussed with respect to FIG. 4, the method 400 may also include modeling and threshold modification of artifacts caused by other sources, such as, the screen itself as described in the 10/844,993 application for patent.

Figure 5:
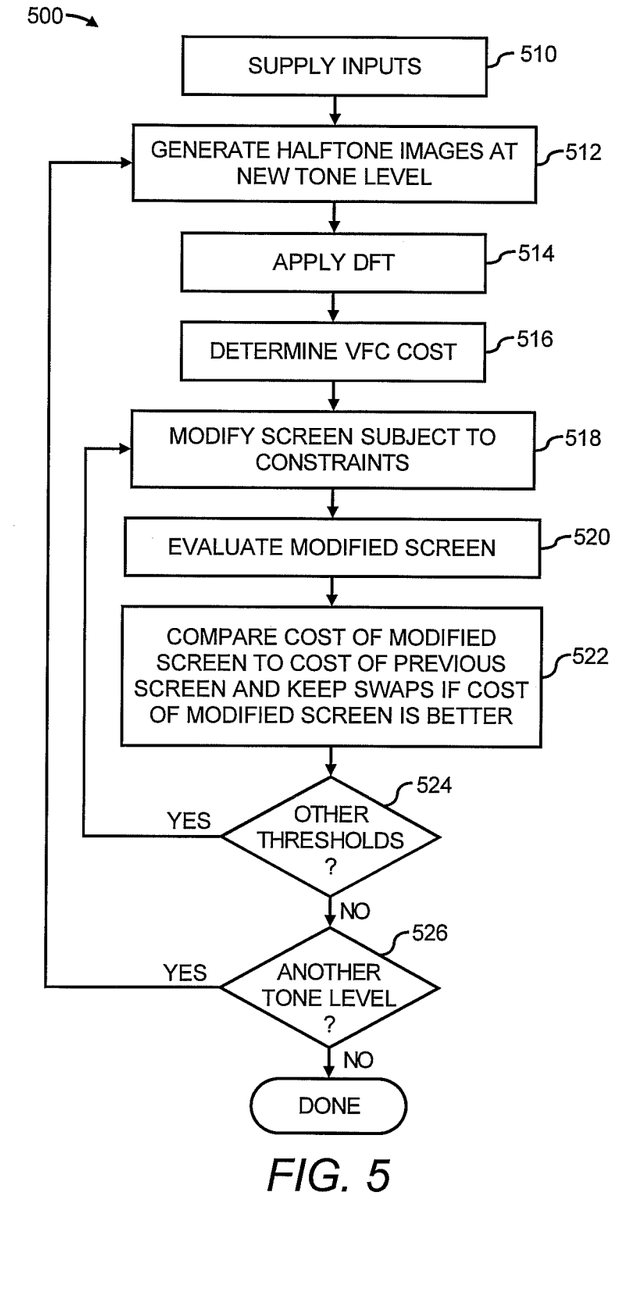
FIG. 5 illustrates a flow diagram of a more specific method of modifying a halftone screen, according to an embodiment of the invention.

Reference is now made to FIG. 5, which illustrates a flow diagram of a more specific method 500 of modifying a halftone screen, according to an example. At step 510, a series of inputs are provided to a computer, such as, the rendering device 210. The inputs include screens for different color separations, an HVS weight matrix, geometrical constraints on the shape of a single cluster, contone input images having tone levels in the range [a, b], etc. One of the screens will be referred to as the primary screen and the other screens will be referred to as secondary screens. In the method 500 of FIG. 5, the primary screen will be evaluated as a single separation or alternatively with respect to one or more of the secondary screens. The HVS weight matrix may have the same size as the primary screen, with weights for every possible frequency. The geometrical constraints prevent the dot cluster growth from being modified in certain ways. For example, the geometrical constraints may prevent isolation of dots or an otherwise reduction in connectivity, or cells that are too acute, or holes within dot clusters.

At step 512, the computer generates a set of halftone images at a first tone level. The primary screen is applied to the input image having the first tone level.

At step 514, a DFT is applied to the halftone images, and visual frequency content (VFC) cost of the primary screen (that is, a scalar which corresponds to visual artifacts level) is determined, as indicated at step 516. The VFC cost of the primary screen(s) at a specific threshold (c) may be defined as:

$$\text{COST}_{VFC}(s,c) = \|\text{abs}(\text{DFT}(s \le c)) * \text{HVS}\|. \quad \text{Equation (4):}$$

In Equation (4), s denotes a plurality of threshold matrices, and c is a scalar corresponding to one level, HVS represents an influence function, and operator * represents a scalar multiplication of matrices (that is, element by element). abs- is the absolute operator (amplitudes of the DFT corresponds to strength for a specific frequency); and $\|\circ\|$ is a cost function of the VFC. For example, a cost function, such as an L2 norm (i.e., the sum of squared weighted transform amplitudes, excluding the DC) may be applied to the weighted transform coefficients. In the alternative, an L_infinity norm (i.e., the largest weighted transform amplitude, excluding the DC) may be used.

According to an example, the contone values (c) for each pixel is compared with the threshold matrices (s), where each of the matrices corresponds to various partial exposure levels, for instance, ⅓, ⅔, ¼, ⅝, etc. The comparison may be performed in an ascending order with respect to the matrices. In addition, the exposure levels assigned to the pixels, between 0 and up to 1, depends upon the number of values in the matrices that the contone values (c) are greater. If the contone value (c) of a pixel is less than all of the matrix values, the pixel has no exposure and thus is assigned a 0 value. If the contone value (c) of a pixel is greater than all of the matrix values, the pixel is assigned a value of 1. If the contone value (c) of a pixel is greater than at least one of the matrix values, the pixel is assigned a value between 0 and 1, for instance, depending upon which of the values in the matrices the contone value (c) exceeds.

The effect of the secondary screens on the pattern may be modeled by performing a convolution of the primary screen and the secondary screens. However, the convolution results in an extremely large number of frequencies. Even for two screens, assuming there are T tones per screen, there are $T^2$ convolution combinations.

Convolution is performed as the sum of all the multiplications of individual frequencies (one from each of the two screens). However, instead of performing convolution and focusing on all frequencies, focus may be placed on (1) frequency pairs which sum up to a low frequency (relative to the HVS weight); and (2) frequency pairs which are dominant (multiplied amplitudes).

Therefore, multi-separation artifacts may be modeled as follows:

1. Focus only on dominant frequencies in each of the secondary screens. Usually these will be the first and possibly the second cell frequencies of the respective screens. In the alternative, these dominant frequencies may be determined by applying secondary screens to different inputs having different tone levels, and performing a DFT on the resulting halftones.

2. Locate the frequency domain region of these frequencies in the primary screen. Note that any of the frequencies in that region might combine with at least one of the dominant frequencies of the secondary screens to produce a low frequency artifact.

3. Ensure that there is no (or at most very low) frequency content in the frequency domain regions of the primary screen as described above.

Thus, instead of multiplying the DFT of a primary screen with typical HVS weights, the DFT is multiplied with an HVS centered at the DC (for single-separation artifacts), and other HVS weight functions centered on interfering frequencies (cell frequencies of the other separations). An example of the weights corresponding to a black separation with additional weights for the first harmonics of the corresponding cyan and magenta screens are described in the 10/844,993 application for patent.

At step 518, the screen 300 may be modified by performing threshold swapping. More particularly, a threshold of the current tone is swapped with a larger threshold. Different types of threshold swapping include Intracell threshold swapping and Intercell threshold swapping. Generally speaking, the threshold swapping modifies the way in which dot clusters are grown.

As the screen 300 is modified, geometric constraints are examined. In addition, a swap is disallowed if a constraint is not satisfied. For example, a swap may be disallowed if it causes dots to be isolated or otherwise reduces connectivity, or makes the cells too acute, or creates holes within dot clusters. In addition, or alternatively, for both Intracell and Intercell swaps, the partial dot exposures of neighboring cells may be swapped instead of swapping the cells completely. By way of example, if two adjacent cells are identified as having partial dot exposures of ⅔, the cells may be modified such that one of the cells has a dot exposure of 1 and the other one of the cells has a dot exposure of ⅔.

At step 520, the modified screen is evaluated by performing steps 514 and 516 on the modified screen. At step 522, the VFC of the modified screen is compared to the VFC of the previous screen. If the swaps reduce the VFC of the original screen, the swaps are kept, in which case the new (lower) VFC is kept as a reference for the VFC of the original screen. Otherwise the swaps are rejected and the original threshold location is restored.

Other possible thresholds of the current tone level are considered, as indicated at step 524. In addition, steps 518-522 may be performed on each possible threshold.

As indicated at step 526, steps 512-524 are repeated for additional tone levels, except that the modified screen is used to generate the images at 512 and is further modified as steps 514-524. These steps are performed until all tone levels have been processed for each screen. Algorithm re-iteration is likely due to the nature of the implementation, which may not find the global minimum at first iteration.

According to an example for the instance where there are two partial exposure levels between the "0" and the "1" exposure levels, three threshold matrices may be employed to determine the components of Function (1). For purposes of this example, the two partial exposure levels are ⅓ and ⅔. For other examples, there may be a lesser number or a larger number of partial exposure levels.

The three threshold matrices may be similar to the screening matrices 312 and 314 depicted in FIG. 3. More particularly, a third screening matrix may be designed for one of the exposure levels. Thus, for instance, the first screening matrix 312 may correspond to the first partial exposure level, the second screening matrix 314 may correspond to a second partial exposure level, and a third screening matrix (not shown) may correspond to the full exposure level. The third screening matrix will have values that are higher than the first and second screening matrices 312 and 314.

In this example, and with respect to Function (1), an output of the first component $$\left(A_t\left\{Pat_{\{0,\frac{1}{3},\frac{2}{3},1\}}\right\}\right)$$

may be calculated from all of the dots forming the two partial exposure levels and the full exposure level, an output of the second component $$\left(\varepsilon_a \cdot A_t\left\{Pat_{\{0,\frac{1}{3},0,0\}}\right\}\right)$$

may be calculated from the dots formed with the first partial exposure level, and an output of the third component $$\left(\varepsilon_b \cdot A_t\left\{Pat_{\{0,0,\frac{2}{3},0\}}\right\}\right)$$

may be calculated from the dots formed with the second partial exposure level.

Figure 6:
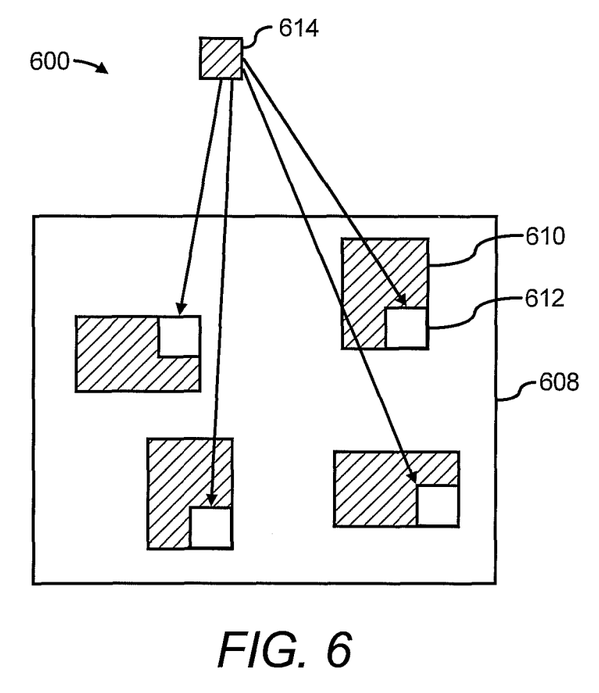
FIG. 6 illustrates a diagram depicting swaps between clusters in a screen, according to an embodiment of the invention.

Reference is now made to FIG. 6, which illustrates a diagram 600 depicting swaps between clusters 610 in a screen 608, according to an example. Several clusters 610 are illustrated, with their next "candidate pixels 612 to be lit" represented by white-filled boxes (a "lit" pixel may be regarded as a darkened or colored pixel, or a pixel upon which ink is deposited under partial dot exposure levels, such as, ⅓, ⅔, ½, etc. or a fully exposure level). Each cell (not shown) of the screen 608 contains a single cluster 610. The next threshold 614 that should be allocated is represented by a cross-hatched box. Cluster pixels that were previously lit to have either the partial or full exposure level are also represented by cross-hatching. An Intercell algorithm allocates the threshold 614 to one of the candidate pixels 612 (which then becomes lit to an exposure level based upon comparisons between the contone value (c) of the pixel with the threshold matrices (s), as discussed above). All pixels within the interval are taken as a bulk. That is, assume that all candidate pixels 612 to be lit to varying exposure levels have thresholds within various intervals, and that the final threshold of each pixel 612 will be set by the Intercell algorithm. The Intercell algorithm re-arranges the order in which the candidate pixels 612 are lit to the varying exposure levels. If the tone interval is large enough, Intracell swaps may occur.

The following Intercell algorithm may be used to determine the best order for this to happen. If each of a plurality of screens contains k thresholds of each of the tone values in the interval [t, t+1], then k out of the 2 k locations will be allocated to threshold t, such that the new pattern (at threshold t) has minimal artifact level (VFC). The other k locations are allocated to threshold t+1. As long as Intracell swap intervals do not occur, the new lit pixels simply appear in a different order, and the clusters do not change. One advantage of this Intercell algorithm is that thresholds outside the interval are not modified.

A screen may be modified by using Intracell swapping in combination with Intercell swapping. Intercell swaps may be used for non-overlapping intervals between minima of the artifact model. This works well as long as the minima are sufficiently close so that there is no more than a single threshold per cell in the tone range. For mid-tones, two or three thresholds per cell per interval may be used. Intracell swaps may be used in small intervals to create minima between the Intercell swaps. Tone intervals are allowed to overlap and the resulting cell shapes are restricted. The resulting cell shapes may be restricted by the same geometric rules that are used for Intracell swaps. For example, a swap may be disallowed if it causes dots to be isolated or otherwise reduces connectivity, or makes the cells too acute, or creates holes within dot clusters.

For both Intracell and Intercell swaps, the partial dot exposures of neighboring cells may be swapped instead of swapping the cells completely. By way of example, if two adjacent cells are identified as having partial dot exposures of ⅔, the cells may be modified such that one of the cells has a dot exposure of 1 and the other one of the cells has a dot exposure of ⅓. Thus, for instance, the neighboring dots may have modified exposure levels whose sum is equal the sum of their original exposure levels.

The halftone screen is not limited to any particular color planes. In color printers, for example, the illusion of continuous shades of color is produced by superimposing the halftonetones of the individual colorants used, for instance, cyan, magenta, yellow and black (CYMK).

All screens may be modified. In the alternative, only the black screen may be modified with respect to cyan and magenta.

Modification of the screens is not limited to swapping. Intercell swapping, for instance, is performed to set the number of pixels of a specific threshold to be different from the original screen, so long as the total number of pixels in the threshold interval is the same as in the original. For example, suppose an original screen has a total number of pixels within the working interval of 1000. Suppose also that the number of thresholds within the interval is ten, and that each threshold contains 100 pixels. It is now possible to set the number of pixels per threshold to be different, for example, by setting the first five thresholds of the modified screen to contain 150 pixels, and the last five thresholds to contain fifty pixels. The total number of pixels within the threshold interval in the modified screen remains 1000, as in the original screen.

Figure 7:
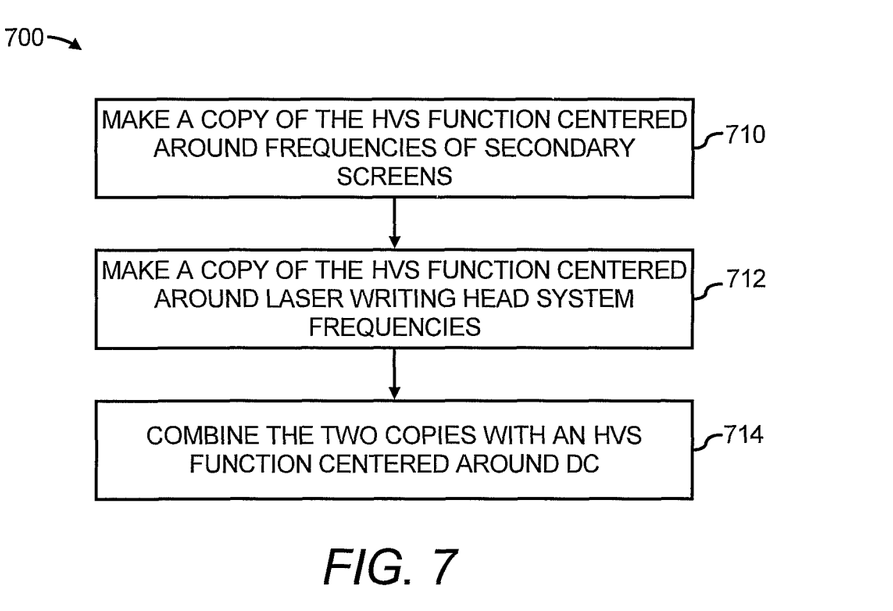
FIG. 7 illustrates a flow diagram of a method depicting that the writing head harmonics, as well as the interfering frequencies from the secondary screens, may be added to the screen model by modifying the influence function, according to an embodiment of the invention.

Referring to FIG. 7, there is shown a flow diagram of a method 700 depicting that the writing head harmonics, as well as the interfering frequencies from the secondary screens, may be added to the screen model by modifying the influence function, according to an example. For example, a copy (replication) of the HVS function centered around frequencies of secondary screens is made at step 710, and a similar copy of the HVS function centered around writing head frequencies is made at step 712. These two copies are summed or otherwise combined with the HVS function centered about DC at step 714.

Another source of harmonic artifacts may come from printing substrates used in certain types of printing processes. In lenticular printing, for example, a special substrate is used to create the illusion of 3 D images or to view different images on the same substrate. The substrate includes parallel lenses. The lenses have a viewing angle that encapsulate several pixels, even though an observer views only one pixel at a time. The parallel lenses may generate harmonic artifacts when they interact with the screens. The number of pixels within the viewing angle of a single lens determines the frequency of the interference. Consider a substrate with vertical lenses that view eight pixels per lens. On an 800 dots per inch (dpi) printing press, the interference frequency is 800/8=100 lines per inch (lpi). The direction of the interference in this example is perpendicular to the laser writing head interference. It has been found that the first few harmonics of the substrate should be accounted for (e.g., nine harmonics), and not just the first harmonic.

The methods above are performed on a halftone screen that has already been designed. However, a method according to the present invention is not so limited. Screens may be modified during design.

Figure 8:
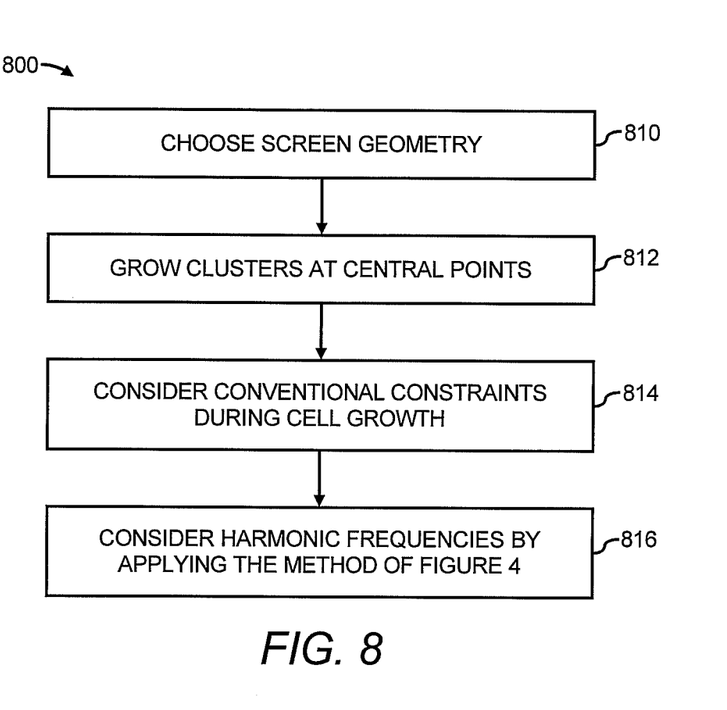
FIG. 8 depicts a flow diagram of a method for modifying a screen during a design instead of after the design, given a screen geometry, cluster geometrical constraints, and the number of pixels for each threshold, according to an embodiment of the invention.

Reference is now made to FIG. 8, which depicts a flow diagram of a method 800 for modifying a screen during a design instead of after the design, given a screen geometry, cluster geometrical constraints, and the number of pixels for each threshold, according to an example. A screen geometry is chosen at step 810. For example, a screen is chosen with a certain orientation and a specific cell size. This gives a grid with multiple central points. A cluster is grown at each central point, as indicated at step 812. Conventional constraints are considered as indicated at step 814. The constraints may include the shape of the cluster, for instance.

Harmonic frequency is also considered as a constraint at step 816. At step 816, the harmonic frequency may also be considered by applying the method of FIG. 4. The interval includes all thresholds. The method of FIG. 4 indicates where to place the next threshold.

As the clusters grow, the voids between them decrease.

Figure 9:
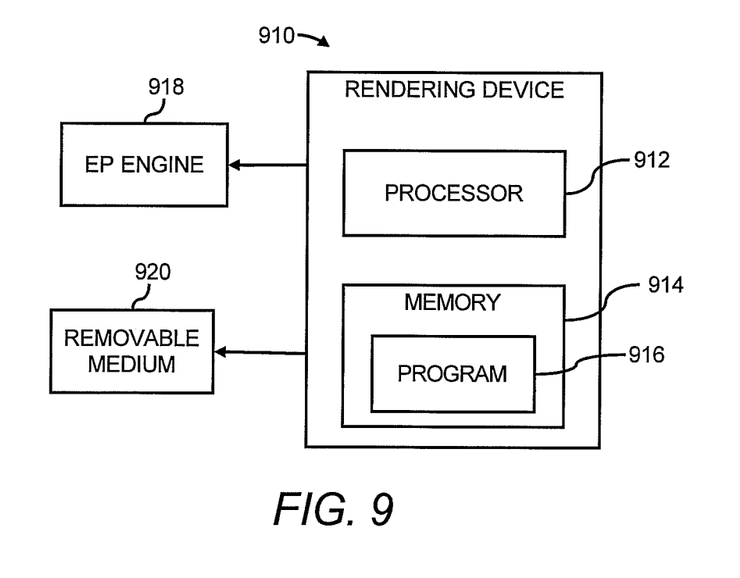
FIG. 9 shows a simplified block diagram of a machine for designing a halftone screen, according to an embodiment of the invention.

Reference is now made to FIG. 9, which illustrates a machine 910 for designing a halftone screen, according to an example. The machine 910 includes a processor 912 and memory 914. The memory 914 may include a program 916 for causing the processor to design and/or modify the halftone screen according to the present invention.

The designed halftone screen may be distributed in a variety of ways. Once a screen is generated, it may be loaded into an electrophotographic print (EP) engine 918 as part of its software. In other types of EP engines 918, such as, a digital printing press, the screen may be part of a print driver. The print driver or other software can be distributed via a removable medium 920 such as an optical disc (e.g., DVD) or transmitted (e.g., over the Internet) from memory of one machine to another, etc.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for designing a halftone screen to reduce artifacts in a printed image, said method comprising:
    modeling, by a processor, artifacts due to a process variation resulting from printing of the image through use of a halftone screen design, wherein the halftone screen design includes multiple partial dot exposures and wherein the artifacts further comprise artifacts due to patterns for each of the multiple partial dot exposures; and
    designing, by the processor, the halftone screen to have threshold values that substantially reduce the artifacts due to the process variation.

2. The method according to claim 1, wherein modeling the artifacts further comprises modeling the artifacts as a function of parameters representing process variants.

3. The method according to claim 2, wherein modeling the artifacts further comprises modeling the artifacts as a linear approximation with respect to the parameters representing the process variants.

4. The method according to claim 1, wherein the model of the artifacts comprises weights between linear components of a cost function corresponding to a component representing artifacts due to a nominal process variant value and multiple components representing artifacts due to deviations from the nominal process variant value for each of the modeled process variants.

5. The method according to claim 1, wherein modeling artifacts further comprises modeling a first component containing a pattern of a nominal pattern, modeling a second component containing a pattern of a first partial dot exposure, wherein the second component is weighted by a scalar.

6. The method according to claim 1, wherein designing the halftone screen to have threshold values that substantially reduce the artifacts due to the process variation further comprises:
    performing at least one of an Intracell swap and an Intercell swap on at least one of the threshold values.

7. The method according to claim 1, wherein modeling artifacts further comprises modeling multi-separation artifacts by focusing on dominant frequencies in each of a plurality of secondary screens, locating a frequency domain region of the dominant frequencies in a primary screen, and substantially ensuring that there is substantially no frequency content in the frequency domain region of the primary screen.

8. The method according to claim 1, wherein the halftone screen design includes a first pixel having a first dot exposure adjacent to a second pixel having a second dot exposure, and wherein designing the screen to have threshold values that substantially reduce the artifacts caused by the process variation further comprises:
    modifying the first dot exposure and the second dot exposure to be varied by less than a full dot exposure.

9. The method according to claim 8, wherein modifying the first dot exposure and the second dot exposure further comprises modifying the first dot exposure and the second dot exposure to have values whose sum is equal to a sum of the initial first dot exposure and the second dot exposure.

10. An apparatus for designing a halftone screen to reduce artifacts in a printed image, said apparatus comprising:
   a processor; and
   a memory on which is stored machine readable instructions that when executed by the processor cause the processor to model artifacts due to a process variation resulting from printing of the image through use of a halftone screen design as a function of parameters representing process variants, wherein the function of parameters comprises a linear approximation, and to design the halftone screen to have threshold values that substantially reduce the artifacts due to the process variation.

11. The apparatus according to claim 10, wherein the model comprises weights between linear components of a cost function corresponding to a component representing artifacts due to a nominal process variant value and multiple components representing artifacts due to deviations from the nominal process variant value for each of the modeled process variants.

12. The apparatus according to claim 10, wherein the halftone screen design includes multiple partial dot exposures and wherein the machine readable instructions are further to cause the processor to model artifacts due to patterns for each of the multiple partial dot exposures.

13. A non-transitory computer readable storage medium on which is embedded one or more computer programs that when executed by a processor implement a method for designing a halftone screen to reduce artifacts in a printed image, said one or more computer programs comprising computer readable code that is to cause the processor to:
   model artifacts due to a process variation resulting from printing of the image through use of a halftone screen design, wherein the model comprises weights between linear components of a cost function corresponding to a component representing artifacts due to a nominal process variant value and multiple components representing artifacts due to deviations from the nominal process variant value for each of the modeled process variants;
   minimize the cost function; and
   design the halftone screen based upon the minimized cost function to have threshold values that substantially reduce the artifacts due to the process variation.

* * * * *